United States Patent [19]
Samukawa et al.

[11] Patent Number: 5,642,856
[45] Date of Patent: Jul. 1, 1997

[54] AIR CONDITIONER

[75] Inventors: Katsuhiko Samukawa, Obu; Yuji Honda, Okazaki, both of Japan

[73] Assignee: Nippondenso Co., Ltd., Kariya, Japan

[21] Appl. No.: 544,466

[22] Filed: Oct. 18, 1995

[30] Foreign Application Priority Data

Oct. 19, 1994 [JP] Japan .................. 6-253912

[51] Int. Cl.$^6$ .................................................. B60H 1/00
[52] U.S. Cl. .................... 236/49.3; 236/1 B; 165/203; 62/179
[58] Field of Search ................ 62/179, 243, 244, 62/186; 165/203, 204, 205; 236/1 B, 13, 49.3

[56] References Cited

U.S. PATENT DOCUMENTS

| | | | |
|---|---|---|---|
| 4,460,036 | 7/1984 | Yoshimi et al. | 62/244 X |
| 4,477,018 | 10/1984 | Rathgeber | 236/1 B |
| 4,482,009 | 11/1984 | Nishimura et al. | 62/244 X |
| 4,537,245 | 8/1985 | Nishimura et al. | 165/22 |
| 4,665,971 | 5/1987 | Sakurai | 165/22 |
| 4,856,710 | 8/1989 | Takada et al. | 236/13 |
| 5,181,553 | 1/1993 | Doi | 165/22 |
| 5,337,802 | 8/1994 | Kajino et al. | 165/203 |
| 5,390,728 | 2/1995 | Ban | 165/204 |
| 5,452,587 | 9/1995 | Honda et al. | 62/244 |

FOREIGN PATENT DOCUMENTS 5-213050  8/1993  Japan .

*Primary Examiner*—Harry B. Tanner
*Attorney, Agent, or Firm*—Cushman, Darby & Cushman IP Group of Pillsbury Madison & Sutro LLP

[57] ABSTRACT

An air conditioner capable of separately controlling the temperatures of the conditioned air blown to first and second air conditioning zones and making respective blowing modes be common on both air passage sides, wherein the target blowing temperature is determined from the necessary blowing temperature corresponding to respective blowing modes and the opening degree of the air mix door is controlled based on said target blowing temperature, thereby the blowing temperature to the respective air conditioning zones in the respective modes being within a range of temperatures that cause no feeling of discomfort to an air conditioner user in the respective blowing modes.

10 Claims, 8 Drawing Sheets

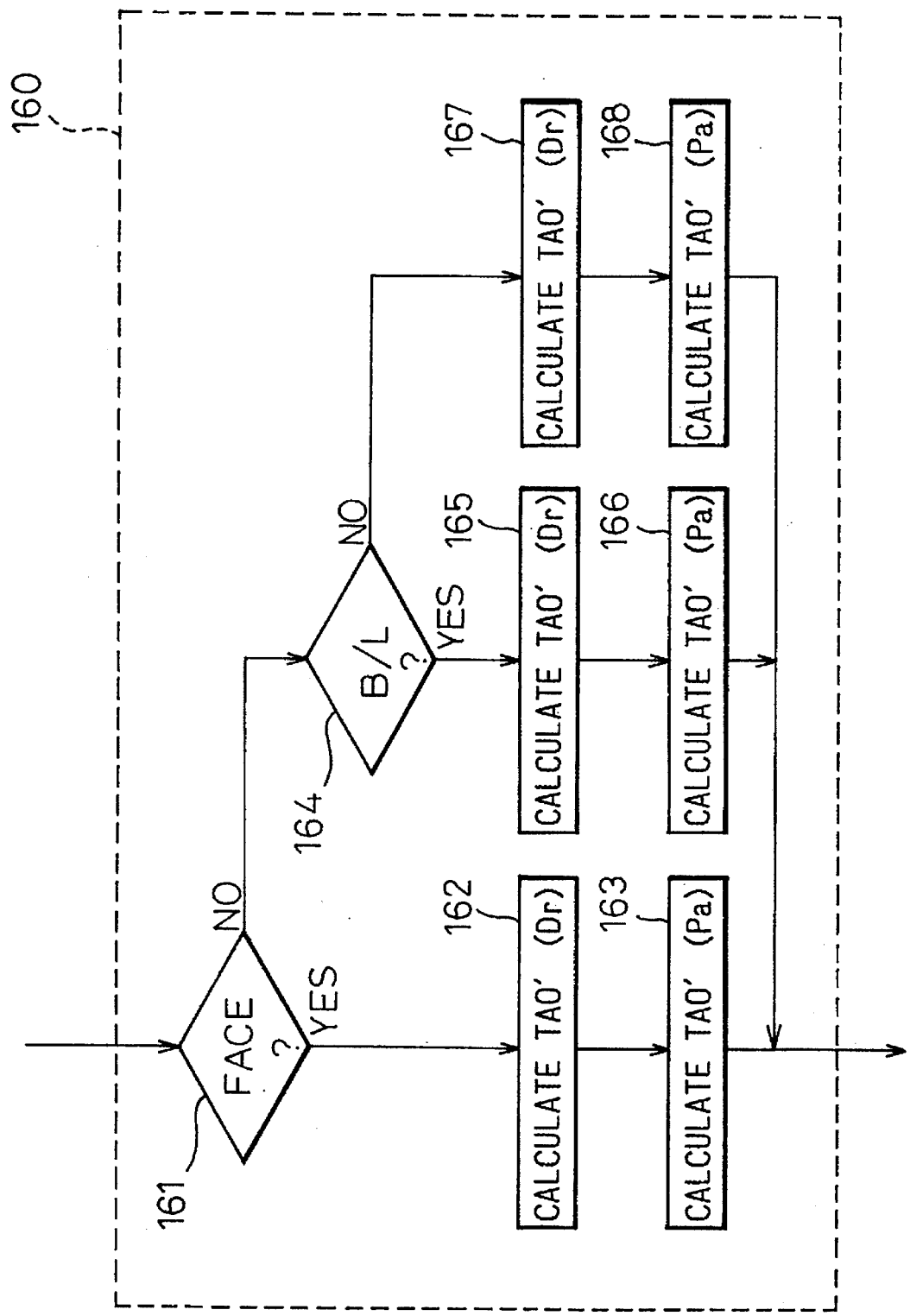

(i=(Dr) or (Pa))

AIR CONDITIONER

BACKGROUND OF THE INVENTION

1. Field of the Invention

The present invention relates to an air conditioner capable of separately controlling the temperatures of the conditioned air flows blown into the first and second air conditioning zones in a vehicle passenger compartment.

2. Description of the Related Art

As will be seen, for instance, from the disclosure in a Japanese Unexamined Patent Publication (Kokai) No. Hei 5-213050, there is already known a vehicular air conditioner which can separately control the temperatures of the conditioned air flows blown into the driver's seat side (first air conditioning zone) and the same blown to the passenger's seat side (second air conditioning zone).

More concretely, in the vehicular air conditioner of this kind, there are provided a driver's seat side air conditioning duct (first air passage) and an passenger's seat side air conditioning duct (second air passage) in correspondence with said respective seat sides and, in these respective air conditioning air ducts, there are provided first and second temperature regulating means for regulating the temperature of the air in said ducts. At the downstream end of said driver's seat side air conditioning duct, there are arranged a first face air outlet for blowing the conditioned air directing to the upper half of the driver's body and a first foot air outlet for blowing the conditioned air directing to the driver's foot area. Also, at the downstream end of the passenger's seat side air conditioning duct, there are arranged a second face air outlet for blowing the conditioned air directing to the upper half of the passenger's body and a second foot air outlet for blowing the conditioned air directing to the passenger's foot area.

First and second target air temperatures at said respective seat sides are calculated based on the respective setting temperatures set by the temperature setting devices (first and second temperature setting means), which are provided corresponding to said respective seat sides, and the temperatures measured on the respective seat sides. Said respective temperature regulating means are separately controlled in such a manner that the temperatures of the conditioned air blown to said respective seat sides come to said calculated first and second target blowing temperatures, thereby separately controlling the blowing temperatures to the respective seat sides.

At the downstream end of the driver's seat side air conditioning duct, there is further provided a driver's seat side air outlet changeover door (the air volume proportion regulating means) for regulating the air volume proportion of the air volume blown from said first face air outlet to the same from said first foot air outlet, so-called, for regulating a driver's seat side blowing mode. Similarly, at the downstream end of the passenger's seat side air conditioning duct, there is provided the passenger's seat side air outlet changeover door (the air volume proportion regulating means) for regulating the air volume proportion of the air volume blown from said second face air outlet to the same from said second foot air outlet, so-called, for regulating the passenger's seat side blowing mode.

From the characteristics as shown in FIG. 6, the driver's seat side blowing mode is determined based on said first target blowing temperature, and similarly, from said characteristics of FIG. 6, the passenger's seat side blowing mode is determined based on said second target blowing temperature. Thus, the respective blowing modes are separately set.

In the air conditioner as constituted as above, for instance, the driver's seat side setting temperature and the passenger's seat side temperature can be very different from each other, so that, the first target blowing temperature is low (e.g. T1 in FIG. 6) and the second target blowing temperature is high (e.g. T2 in FIG. 6). Even in such a case, the driver's seat side blowing mode and the passenger's seat side blowing mode can still be set to be the face mode and the foot mode, respectively, and thus, the blowing modes for the seats become the modes to obtain the respective blowing temperatures.

Recently, however, a vehicular air conditioner of a low cost type is drawing the attention of those skilled in the art, in contrast to the above mentioned vehicular air conditioner. In case of the latter air conditioner, as described in the above, air outlet changeover doors (blowing air volume proportion regulating means) are provided corresponding to respective seat sides, thus enabling respective blowing modes to be separately controlled. In said air conditioner of the low cost type, however, the blowing modes to respective seat sides are controlled by a common air outlet changeover door, thereby making the blowing modes to respective seat sides the same.

In the air conditioner of this type, since the blowing mode has to be made common to respective seat sides even though said first target blowing temperature is different from said second one, a suitable way to meet such requirement must be found, for instance, a method of calculating a mean value from the first and second blowing temperatures in such a manner that the blowing mode satisfies both of said target blowing temperatures to the utmost, and setting the blowing mode based on said calculated mean value and the characteristics of FIG. 6.

In this case, however, assuming that, for instance, the first target blowing temperature is the said T1, the second one is T2, and the mean value of T1 and T2 is T3, the blowing mode based on this T3 is determined as the face mode from the characteristics of FIG. 6. As a result of this, the cold air is supplied to the driver's seat side from the face air outlet, thus no problem occurs in this respect. However, as to the passenger's seat side, the warm air is supplied to the passenger's seat side from the face air outlet, so that he might feel uncomfortable.

Also, assuming that the mean value of said T1 and T2 is higher than said T3 and the blowing mode based on this mean value is the foot mode, the warm air is supplied to the passenger's seat side from the foot air outlet, thus there being no problem in this respect, but as to the driver's seat side, the cold air is supplied to the driver from the foot air outlet, so that he might feel uncomfortable.

SUMMARY OF THE INVENTION

The present invention has been made in view of the above mentioned problems in the prior art air conditioner. Accordingly, an object of the present invention is to provide an air conditioner which can separately control the temperatures of the conditioned air flows supplied to first and second air conditioning zones through the face air outlet or the foot air outlet, which is arranged at the downstream end of the first and second air passages, and makes the blowing mode of said respective air outlets be common in both of said air passages, wherein the blowing temperatures of the conditioned air supplied to the first and second air conditioning zones are within a range of the temperature that will cause no uncomfortable feelings to the air conditioner users in the respective air conditioning zones, regardless of the blowing mode.

In order to achieve the above object, according to the present invention, the target blowing temperature is determined from the necessary blowing temperature in correspondence with respective blowing modes, and the degree of the air mix door opening is controlled based on said determined target blowing temperature, whereby the blowing temperatures to respective air conditioning zones in respective modes are within a range of the temperature that is allowed in the respective blowing modes.

BRIEF DESCRIPTION OF THE DRAWINGS

FIG. 8 is a flowchart for showing the details of step 160 in FIG. 3.

DESCRIPTION OF THE PREFERRED EMBODIMENTS

Next, a first embodiment of the present invention will be explained in connection with a vehicular air conditioner capable of separately controlling respective blowing temperatures to the driver's seat side as a first air conditioning zone and to the passenger's seat side as a second air conditioning zone.

First of all, the overall construction of the present embodiment will be explained with reference to FIG. 1.

Figure 1:
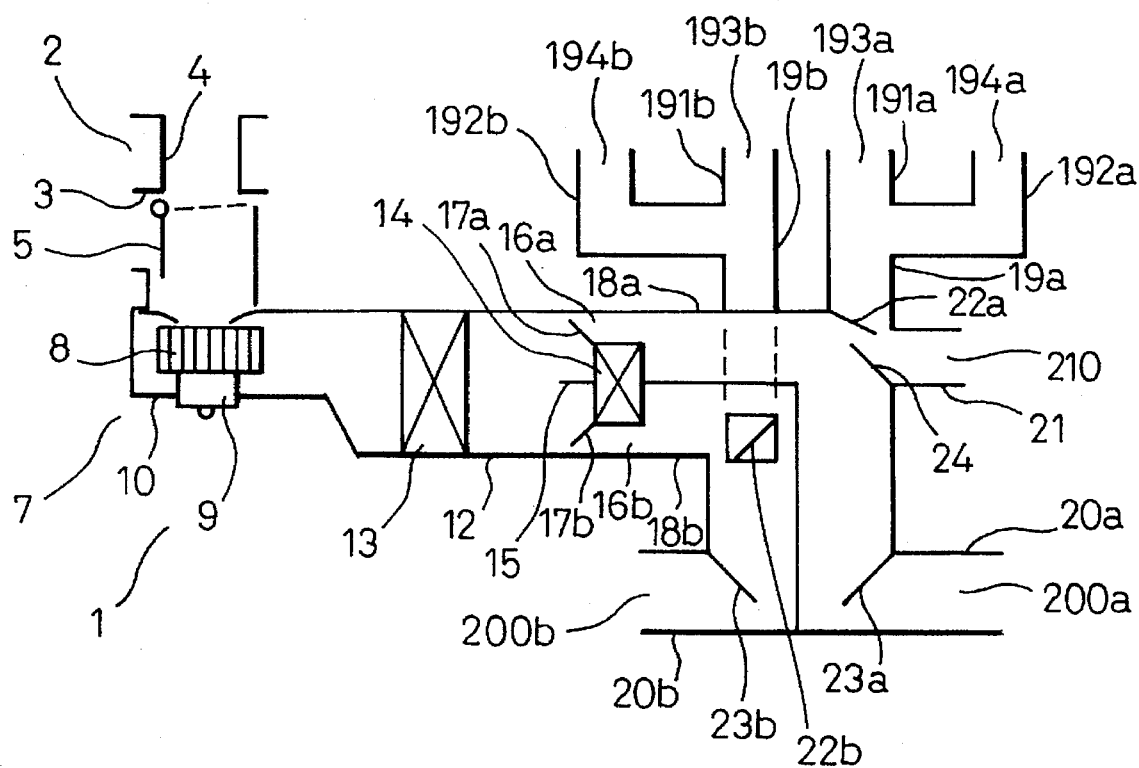
FIG. 1 is a schematic diagram showing the over-all construction of the air-flow system according to the first embodiment of the present invention.

In FIG. 1, a reference numeral 1 indicates the overall air-flow system of the vehicular air conditioner, and the bulk of this system 1 is disposed under the dashboard arranged in the vehicle compartment.

An inside/outside air changeover box 2 is provided on the upstream side of the air-flow system 1. In the inside/outside air changeover box 2, there are formed an inside air intake 3 and an outside air intake 4, and further, there is provided at the portion from which said two air intakes 3, 4 are separated each other, an inside/outside air changeover door 5 which is used for selectively opening and closing said two air intakes. This inside/outside changeover door 5 is connected to a driving means 6 (more concretely, a servo motor, see FIG. 2).

At the air outlet portion of the inside/outside air change over box 2, there is provided a centrifugal type electric fan 7 as a blowing means which comprises a centrifugal fan 8, a blower motor 9 for driving said fan 8, and a scroll casing 10 for accommodating the centrifugal fan 8. The blower voltage applied to the blower motor 9 is controlled by a blower motor controller 11 (see FIG. 2).

A reference numeral 12 designates the case of the air conditioning unit, which is connected to said scroll casing 10 at the air outlet side thereof. In the case 12, there are disposed an evaporator 13 which serves as an air cooling means and a heater core 14 which serves as an air heating means and is located downstream to said air cooling means 13. Further, there is disposed in the case 12 a baffle plate 15 which is located in front of the core heater 14. Still further, there are provided at both sides (top and bottom sides in FIG. 1) of the heater core 14 in the case 12, bypasses 16a and 16b through which the cold air cooled by the evaporator 13 can bypass the heater core 14.

Figure 2:
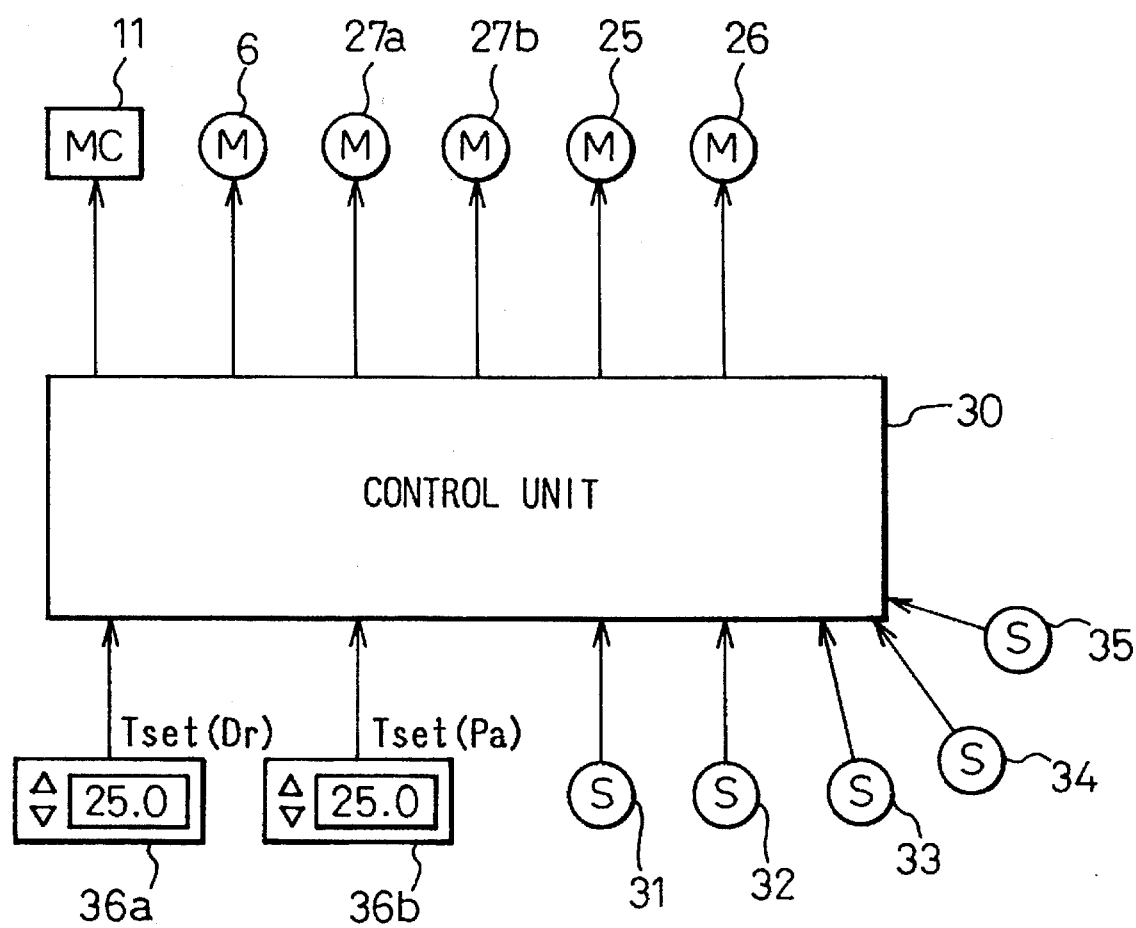
FIG. 2 is a block diagram of the control system for the above embodiment.

On the upstream side of the heater core 14, in the air flow, there are provided two air mix door 17a and 17b, which are driven by driving means 27a and 27b, respectively (more concretely, servo motors, see FIG. 2). Said air mix door 17a regulates, by means of the degree of its opening, the volume of the cold air that comes from the evaporator 13, and passes through an upper part of the core heater 14 above the baffle plate 15 in the figure, and the volume of the cold air coming from the same and passing through the bypass 16a. On the other hand, said air mix door 17a regulates, by means of the degree of its opening, the volume of said cold air that passes through the lower part of the core heater 14 below the baffle plate 15 in the figure, and the volume of the cold air passing through the bypass 16b.

The evaporator 13 as described above is a heat exchanger which is connected through necessary piping to a not shown compressor, condenser, liquid receiver, and decompressor, thereby achieving a known refrigeration cycle, and dehumidifying and cooling the air flowing in the case 12. The above compressor is connected to the vehicular engine through a not shown electromagnetic clutch, and the operation of the compressor is controlled through the on-off control of said clutch.

The heater core 14 as mentioned above is a sort of a heat exchanger utilizing a cooling water of the vehicular engine as its heat source and reheats the cold air that has been once cooled by the evaporator 13.

Furthermore, two air ducts are connected to the case 12 on its air outlet side. One is a driver's seat side duct 18a for leading the conditioned air to the driver's seat side in the vehicle, the temperature of said conditioned air being regulated according to the opening degree of the air mix door 17a, and the other is a passenger's seat side duct 18b for leading the conditioned air to the passenger's seat side of the vehicle, the temperature of said conditioned air being regulated according to the opening degree of the air mix door 17b.

At the downstream end of said driver's seat side duct 18a, there are arranged a face duct 19a, a foot duct 20a, and a defroster duct 21. Among of these ducts, the face duct 19a branches off in a center face duct 191a and a side face duct 192a. These ducts 191a and 192a are provided at their ends with a center face air outlet 193a and a side face air outlet 194a, respectively, through which the conditioned air is supplied directing to the upper half of driver's body. Also, said foot duct 20a is provided at its end with a foot air outlet 200a which blows the conditioned air toward the driver's foot area. Further, said defroster duct 21 is provided at its end with a defroster air outlet 210 which blows the conditioned air to the inside surface of the vehicle windshield.

On one hand, a face duct 19b and a foot duct 20b are arranged at the downstream end of the passenger's seat side duct 18b. Among these two ducts, the face duct 19b further branches away in two ducts, one being a center face duct 191b and the other being a side face duct 192b. These ducts 191b and 192b are provided at their ends with a center face air outlet 193b and a side face air outlet 194b, respectively, through which the conditioned air is blown directing to the upper half of the passenger's body. Also, said foot duct 20b is provided at its end with a foot air outlet 200b which blows the conditioned air directing to the passenger's foot area.

The face duct 19a, foot duct 20a, and defroster duct 21, are provided on their air intake sides with a face door 22a, foot door 23a, and defroster door 24 for opening and closing their corresponding ducts, respectively. Also, there are provided on the air intake sides of the face duct 19b and foot duct 20b, a face door 22b, and a foot door 23b for opening and closing their corresponding ducts, respectively.

Among these doors as described above, face doors 22a, 22b, and foot doors 23a, 23b are driven by an identical driving means 25 (more concretely, servo motor, see FIG. 2) while the defroster door 24 is driven by a separate driving means 26 (more concretely, a servo motor, see FIG. 2).

In other words, if said driving means 25 drives the face door 22a to fully open the face duct 19a, it also drives the face door 22b, to fully open the face duct 19b, but at the same time, it drives foot doors 23a, 23b to completely close foot ducts 20a, 20b.

Also, if said driving means 25 drives the face door 22a to open the face duct 19a about by half, it also drives the face door 22b, to open the face duct 19b about by half, and at the same time, it drives foot doors 23a, 23b to open foot ducts 20a, 20b about by half.

If said driving means 25 drives the face door 22a to fully close the face duct 19a, it also drives the face door 22b, to fully close the face duct 19b, but at the same time, it drives foot doors 23a, 23b to fully open foot ducts 20a, 20b.

As shown in FIG. 2, a control unit 30 for controlling the air conditioner is connected to the following various sensors, which are an indoor air temperature sensor 31 (located on the driver's seat side) for detecting the air temperature inside the vehicle, an outdoor air temperature sensor 32 for detecting the air temperature outside the vehicle, a solar radiation sensor 33 for detecting the quantity of solar radiation incident in the vehicle, a post-evaporator sensor 34 for detecting the temperature of the air that just has passed through the evaporator 13, and a water temperature sensor 35 for indirectly detecting the temperature of the cooling water for the vehicle engine in the heater core 14. This control unit 30 receives the signals from said respective sensors as input signals thereto.

The control unit 30 is also connected to a driver's seat side temperature setting device 36a for setting a target temperature Tset(Dr) on the driver's seat side in the vehicular room, and also connected to a passenger's seat side temperature setting device 36b for setting a target temperature Tset(Pa) on the passenger's seat side, and receives signals from these setting device as input signals thereto.

These temperature setting device 36a and 36b are installed on the instrument panel which is arranged in the front part of the vehicle.

The control unit 30 is of the known type that includes a not shown A/D converter, a microcomputer, and other ordinarily necessary components. The signals from said respective sensors 31 through 35 are transmitted to the microcomputer after being A/D converted by the A/D, converter.

Said microcomputer is of the known type that includes a not shown CPU, ROM, RAM, I/O and so forth, and its power is supplied from a not shown battery when the ignition switch of the vehicular engine is turned on.

Figure 3:
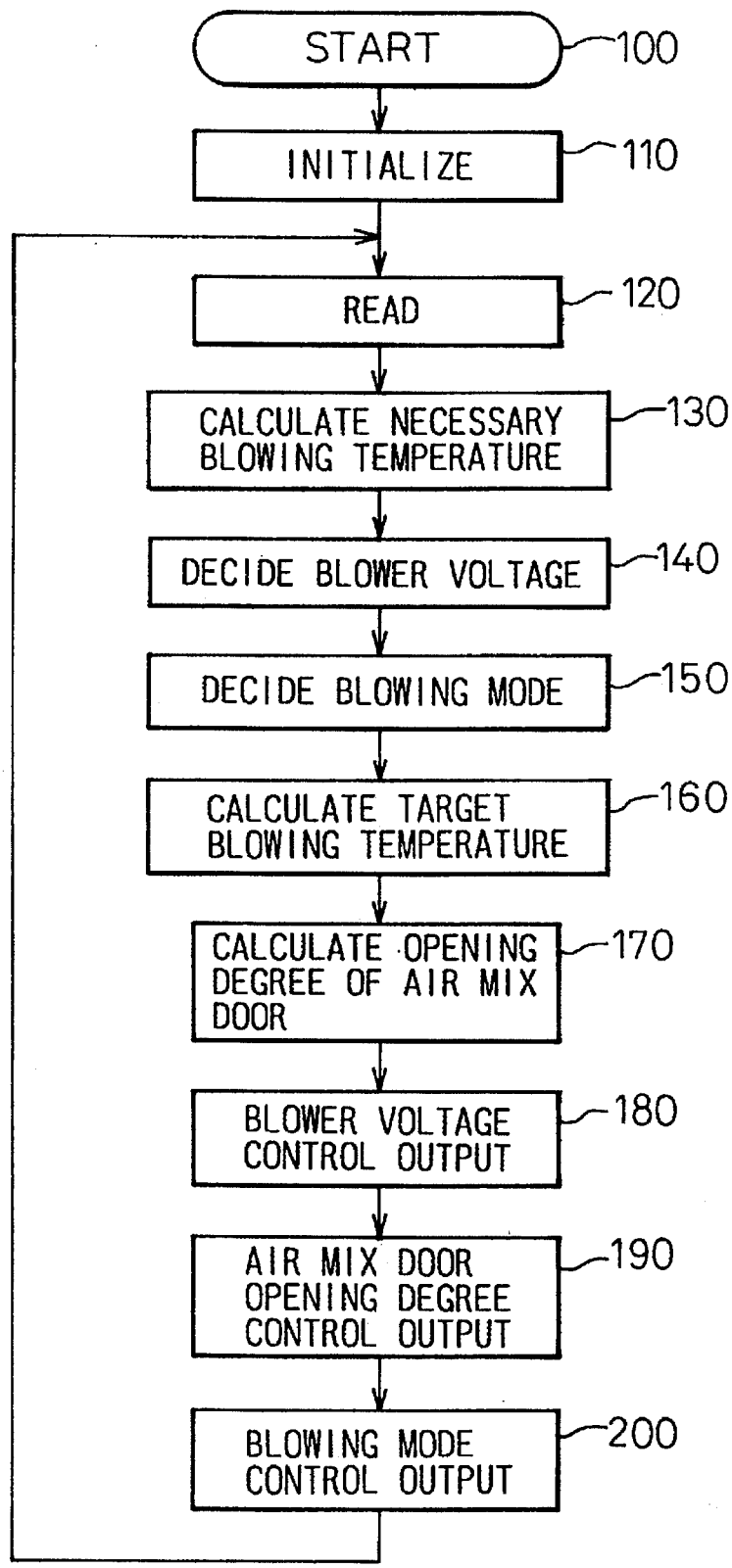
FIG. 3 is a basic flowchart for describing the operation of the above embodiment.

In the next, the operation of the present embodiment will be described referring to the flowchart shown in FIG. 3.

First, if the automatic control process of the air conditioner starts at step 100, all the data are reset (initialized) at step 110. At the next step 102, there are read out the digital signals (Tr, Tam, Ts, Te, Tw) which are obtained by converting the values of signals from said sensors 31 through 35 by means of the A/D converter, and there are also read out the temperatures Tset(Dr) and Tset (Pa) which are set by means of said driver's seat side temperature setting device 36a and passenger's seat side temperature setting device 36b, respectively.

Figure 4:
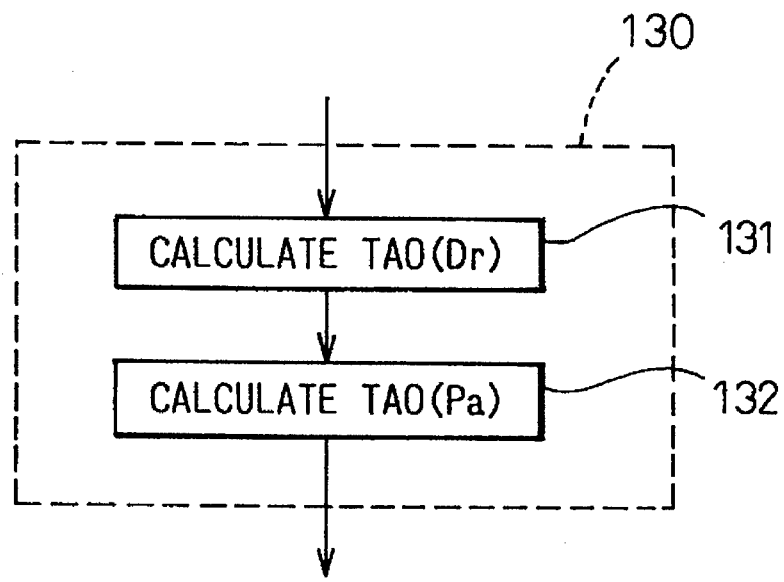
FIG. 4 is a flowchart for showing the details of step 130 in FIG. 3.

At step 130, there are calculated the necessary temperature of the conditioned air blown to the driver's seat side (referred to as TAO(Dr) hereinafter) and the necessary temperature of the conditioned air blown to the passenger's seat side (referred to as TAO(Pa) hereinafter). More concretely, as shown in FIG. 4, the temperature TAO(Dr) is calculated at step 131, by using the undermentioned expression (1) as stored in the ROM and then, the temperature TAO(Pa) is calculated at step 132, by using the following expression (2) as stored in the ROM.

$$TAO(Dr) = Kset \times Tset(Dr) - Kr \times Tr - Kam \times Tam - Ks \times Ts + C \quad (1)$$

$$TAO(Pa) = Kset \times Tset(Pa) - Kr \times Tr - Kam \times Tam - Ks \times Ts + C \quad (2)$$

(where Kset, Kr, Kam, and Ks represent gains while C represents a constant for correction).

Figure 5:
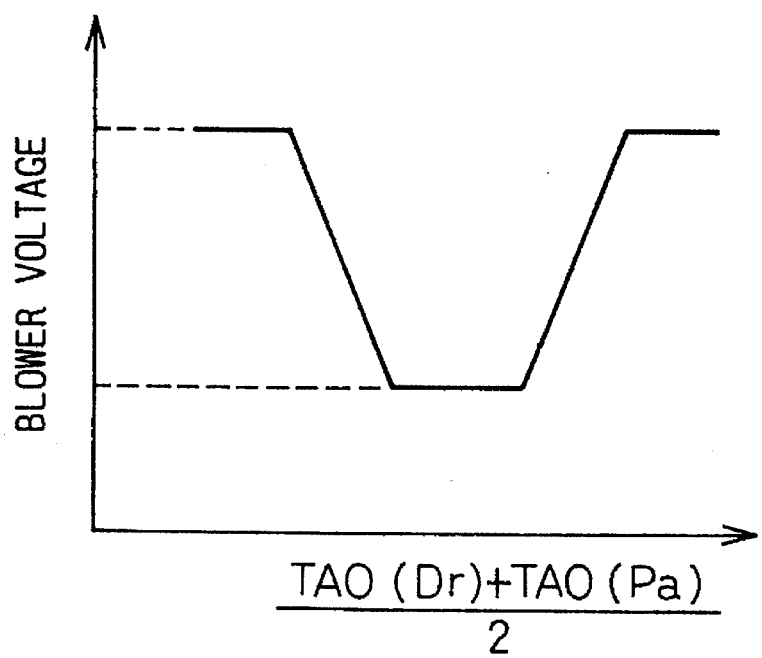
FIG. 5 is a graph showing the characteristic relation between the mean value of necessary blowing temperatures for the driver's seat side and the passenger's seat side, and the blower voltage.

At the next step 140, a blower voltage is decided from a mean value of the above calculated TAO(Dr) and TAO(Pa) by using the characteristics shown in FIG. 5 as stored in the ROM.

Figure 6:
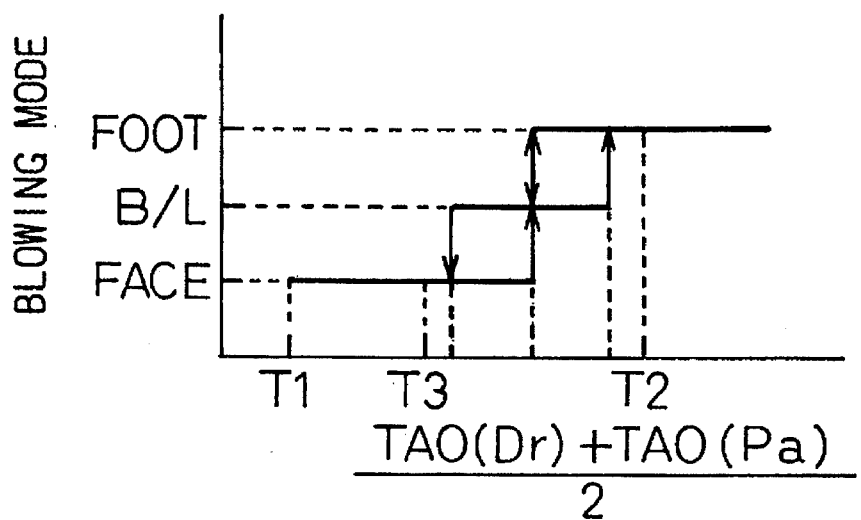
FIG. 6 is a graph showing the characteristic relation between the above mean value and blowing modes.

At step 150, the blowing mode is determined by using the mean value of said calculated TAO(Dr), TAO(Pa) and the characteristics shown in FIG. 6 as stored in the ROM. In this FIG. 6, FACE (face) mode is defined as the mode of blowing the conditioned air from the face air outlets 193a, 194a, 193b, and 194b, and B/L (bi-level) mode is defined as the mode of blowing the conditioned air from both face air outlets 193a, 194a, 193b, 194b, and foot air outlets 200a, 200b, and further, FOOT (foot) mode is defined as the mode of blowing the conditioned air from the foot air outlets 200a, 200b.

At step 160, there are calculated a target temperature of the conditioned air blown to the driver's seat side (referred to as TAO'(Dr) hereinafter) and a target temperature of the conditioned air blown to the passenger's seat side (referred to as TAO'(Pa) hereinafter). This step 160 will be described in more detail later.

Figure 7:
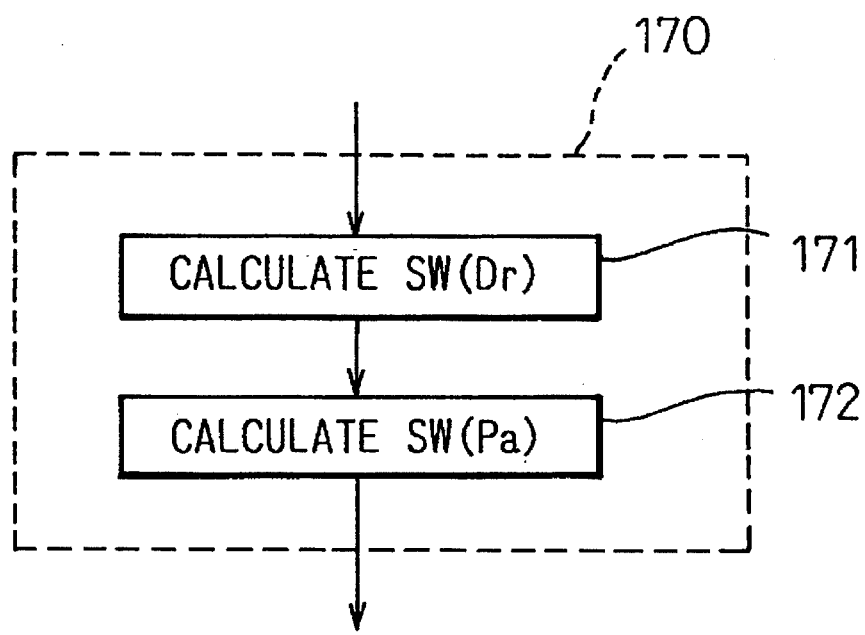
FIG. 7 is a flowchart for showing the details of step 170 in FIG. 3.

At step 170, the opening degree of the air mix doors 17a and 17b is calculated. More concretely, as shown in FIG. 7, the opening degree of the air mix door 17a SW(Dr) is first calculated at step 171 by using the following expression (3) as stored in the ROM and TAO'(Dr) as calculated at step 160, and then, the opening degree of the air mix door 17b SW(Pa) is calculated at step 172 by using the following expression (4) as stored in the ROM and the TAO'(Pa) as calculated at step 160.

$$SW(Dr) = \{(TAO'(Dr) - Te)\}/\{(Tw - Te)\} \times 100(\%) \quad (3)$$

$$SW(Dr) = \{(TAO'(Pa) - Te)\}/\{(Tw - Te)\} \times 100(\%) \quad (4)$$

At steps 180 through 200, the blower controller 11 and the servo motors 27a, 27a, and 25 are driven under control so as to attain respective control target values as calculated at the above steps of 140, 150, and 170, and then, the program is returned to step 120.

In the next, the step 160 as slightly touched on in the above will now be described in detail referring to the flowchart as shown in FIG. 8.

It is first judged at step 161 whether the blowing mode as determined in the above step 150 is the face mode or not. If the result of the judgement is YES, the program is advanced to steps 162 and 163 in sequence where the target blowing temperature to the driver's seat side (TAO'(Dr)) and the same to the passenger's seat side (TAO'(Pa)) are respectively determined based on the characteristics of FIG. 9A as stored in the ROM.

That is, if the necessary blowing temperature to the driver's seat side (TAO(Dr)) is lower than a first predetermined temperature Tb, the target blowing temperature to the driver's seat side (TAO'(Dr)) is set to TAO'(Dr)=TAO(Dr) while if TAO(Dr) is higher than said temperature Tb, TAO'(Dr) is set to TAO'(Dr)=Tb. Also, if the necessary blowing temperature to the passenger's seat side TAO(Pa) is lower than said temperature Tb, TAO'(Pa) is set to TAO'(Pa)=TAO(Pa) while if TAO(Pa) is higher than Tb, TAO'(Dr) is set to TAO'(Dr)=Tb.

Here, the above mentioned predetermined temperature Tb is defined as the temperature that is deemed to generally cause discomfort to most of people if the blowing temperature of the face air outlet is higher than the temperature Tb. This temperature could be experimentally determined.

If the result of judgement is NO at step 161, it is again judged at step 164 whether or not the blowing mode is bi-level mode. If the result of judgement YES at this step, the program is advanced to steps 165 and 166 in this order to determine TAO'(Dr) and TAO'(Pa) referring to the characteristics shown in FIG. 9B as stored in the ROM.

Namely, if TAO(Dr) is higher than a second predetermined temperature Tc, but lower than a third predetermined temperature Td, TAO'(Dr) is set to TAO'(Dr)=TAO(Dr), and if TAO(Dr) is lower than the second predetermined temperature Tc, TAO'(Dr) is set to TAO'(Dr)=Tc, and if TAO(Dr) is higher than the third predetermined temperature Td, TAO'(Dr) is set to TAO'(Dr)=Td. In a similar way, if Tc≦TAO(Pa)≦Td, TAO'(Pa) is set to TAO'(Pa)=TAO(Pa), and if TAO(Pa)≦Tc, TAO'(Pa) is set to TAO'(Pa)=Tc, and if TAO(Pa)≧Td, TAO'(Pa) is set to TAO'(Pa)=Td.

Here, in the present embodiment, when the mode is the bi-level mode, the temperature from the face air outlet is reduced to a predetermined target blowing air temperature TAO'i while the temperature from the foot air outlet is increased to the same, thereby increasing the high/low difference in the temperature. For instance, assuming that TAO'(Dr)=30° C. the temperature from the face air outlet is set at 25° C. while the same from the foot air outlet is set at 40° C.

Accordingly, said second predetermined temperature Tc is defined as such a temperature that if the target blowing temperature TAO'i is made lower than this temperature Tc, it is deemed that the foot blowing temperature as set higher than the target blowing temperature would give the vehicular crew a feeling of physical disorder. Also, said third predetermined temperature Td is defined as such a temperature that if the target blowing temperature TAO'i is made higher than this temperature Td, it is deemed that the face blowing temperature as set lower than the target blowing temperature would give the driver and passenger an uncomfortable feeling. Tc and TD can be experimentally determined.

Figure 9A:
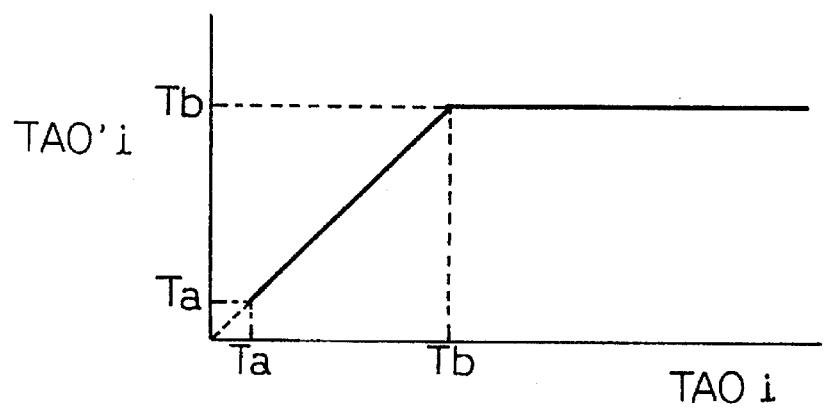
FIG. 9A is a graph showing the characteristic relation between the necessary blowing temperature and the target blowing temperature in the face mode, among respective blowing modes in the above first embodiment.
Figure 9B:
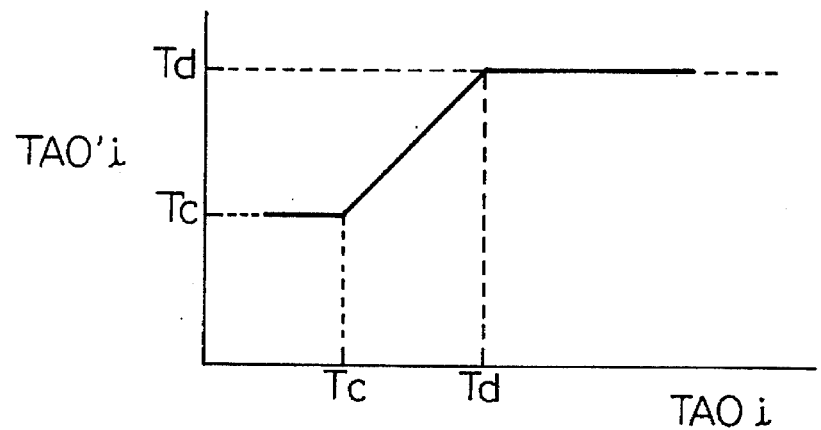
FIG. 9B is a graph showing the characteristic relation between the necessary blowing temperature and the target blowing temperature in the bi-level mode, among respective blowing modes in the above first embodiment.
Figure 9C:
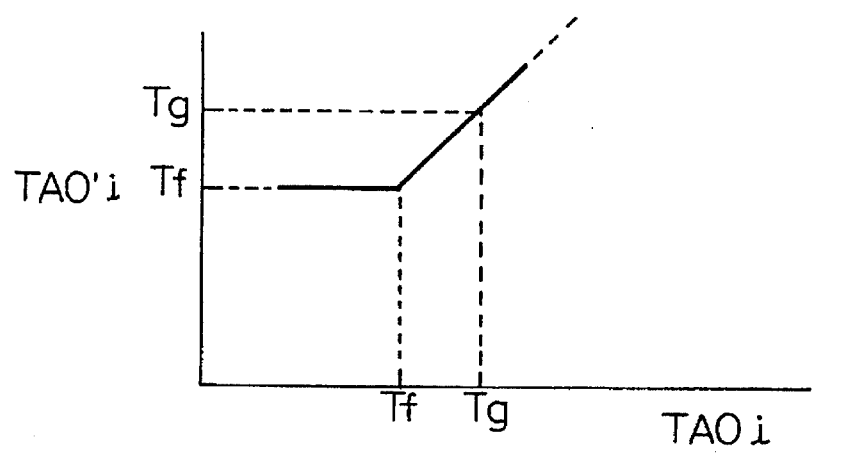
FIG. 9C is a graph showing the characteristic relation between the necessary blowing temperature and the target blowing temperature in the foot mode, among respective blowing modes in the above first embodiment.

If the result of judgement is NO at step 164 and the blowing mode decided at step 150 is the foot mode, the program is advanced to steps 167 and 168 in this order to determine TAO'(Dr) and TAO'(Pa) according to the characteristics of FIG. 9C as stored in the ROM.

That is, if TAO(Dr) is higher than a fourth predetermined temperature Tf, TAO'(Dr) is set to TAO'(Dr)=TAO(Dr), and if lower than the fourth predetermined temperature Tf, TAO'(Dr) is set to TAO'(Dr)=Tf. Also, as to TAO(Pa), if it is higher than a fourth predetermined temperature Tf, TAO'(Pa) is set to TAO'(Pa)=TAO(Pa). If it is lower than the fourth predetermined temperature Tf, TAO'(Pa) is set to TAO'(Pa)=Tf.

Here, said fourth predetermined temperature Tf is defined as such a temperature that is deemed to be generally uncomfortable to most of people if the blowing temperature from the foot air outlet is lower than this fourth predetermined temperature Tf. This temperature can be experimentally determined.

As described above, according to the present invention, there can be determined TAO'(Dr) and TAO'(Pa) having different variable ranges, and the opening degree of the air mix doors 17a, 17a is calculated based on these TAO'(Dr) and TAO'(Pa), thereby attaining the effects as described in the following.

For instance, if the blowing mode as decided at step 150 is the face mode, the blowing mode to both of the driver's seat side and passenger's seat sides becomes the face mode. At this time, if the necessary blowing temperature to the driver's seat side TAO(Dr) is lower than the first predetermined temperature Tb while the necessary blowing temperature to the passenger's seat side TAO(Pa) is higher than said temperature Tb, the driver would not have an uncomfortable feeling even though the conditioned air is blown to him by setting the necessary blowing temperature TAO(Dr) as the target blowing temperature, but the passenger would have an uncomfortable feeling if the air is supplied to him at the necessary blowing temperature TAO(Pa).

According to the present embodiment, however, the necessary blowing temperature to the passenger's seat side TAO(Pa) is limited to the first predetermined temperature Tb based on the characteristics as shown in FIG. 9A, and the conditioned air is supplied to the passenger's seat side by setting this limited temperature as the target blowing temperature to the passenger's seat side TAO'(Pa), so that it can be avoided that warm air is blown directing onto upper half of the passenger's body.

Also, in the bi-level mode, if the necessary blowing temperature to the driver's seat side TAO(Dr) is lower than the second predetermined temperature Tc while the necessary blowing temperature to the passenger's seat side TAO (Pa) is higher than the third predetermined temperature Td, blowing the conditioned air at these necessary blowing temperatures as the target blowing temperature would result in blowing the cold air directly into the driver's foot area and, at the same time, blowing the warm air directly onto the upper half of the passenger's body.

In the present embodiment, as shown in FIG. 9B, the necessary blowing temperature to the driver's seat side TAO(Dr) is limited to the second predetermined temperature Tc, and the conditioned air is blown by using this limited temperature as the target blowing temperature to the driver's seat side TAO'(Dr), and at the same time, the necessary blowing temperature to the passenger's seat side TAO(Pa) is limited to the third predetermined temperature Td, and the conditioned air is blown by using this limited temperature as the target blowing temperature TAO'(Pa). Thus, it can be obviated that cold air is blown directly into the foot area of the driver and also that the warm air is blown directly into the upper half of the passenger's body.

Furthermore, in the foot mode, if the necessary blowing temperature to the driver's seat side TAO(Dr) is lower than the fourth predetermined temperature Tf while the necessary blowing temperature to the passenger's seat side TAO(Pa) is higher than the fourth predetermined temperature Tf, even though the conditioned air is blown onto the passenger by setting the necessary blowing temperature TAO(Pa) as the target blowing temperature, the passenger would not have any feeling of discomfort, but blowing the conditioned air with said necessary blowing temperature TAO(Dr) to the driver's seat side would give a feeling of discomfort to the driver.

Therefore, in the present embodiment, as shown in FIG. 9C, the necessary blowing temperature to the driver's seat side TAO(Dr) is limited to the fourth predetermined temperature Tf, and the conditioned air is blown to him by using this limited temperature as the target blowing temperature to the driver's seat side TAO'(Dr), thereby it being obviated that cold air is blown directly into the foot area of the driver.

In the next, there will be described the second embodiment according to the present invention.

Figure 10A:
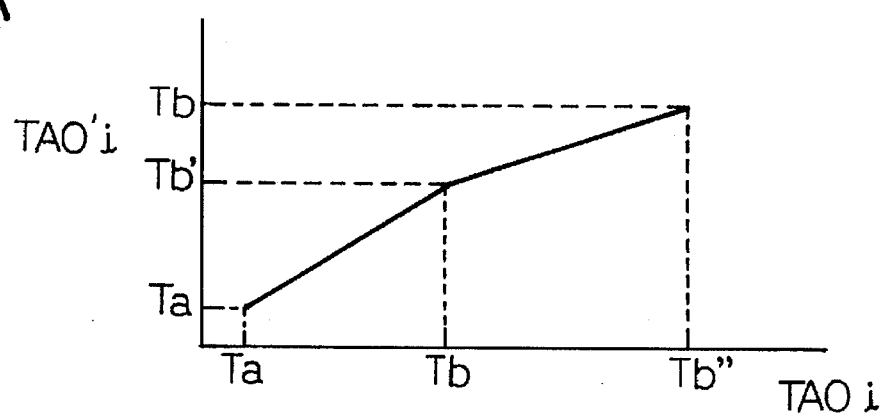
FIG. 10A is a graph showing the characteristic relationship between the necessary blowing temperature and the target blowing temperature in the face mode, among respective blowing modes in the second embodiment of the present invention.
Figure 10B:
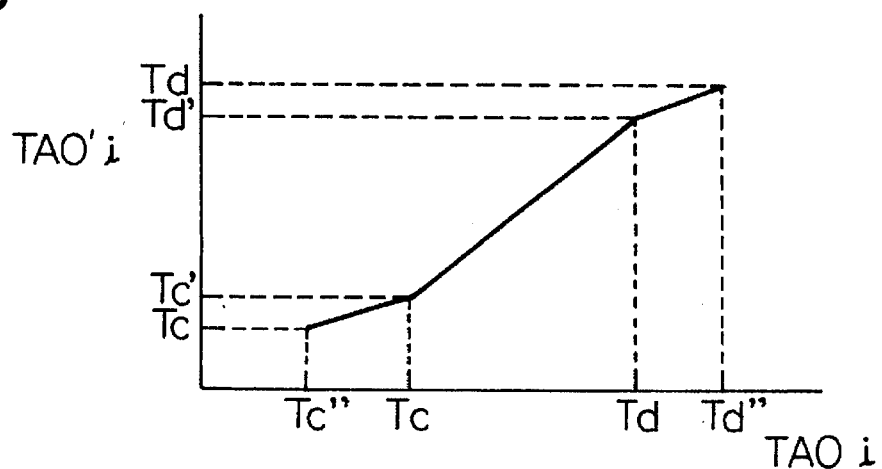
FIG. 10B is a graph showing the characteristic relationship between the necessary blowing temperature and the target blowing air temperature in the bi-level mode, among respective blowing modes in the second embodiment of the present invention.
Figure 10C:
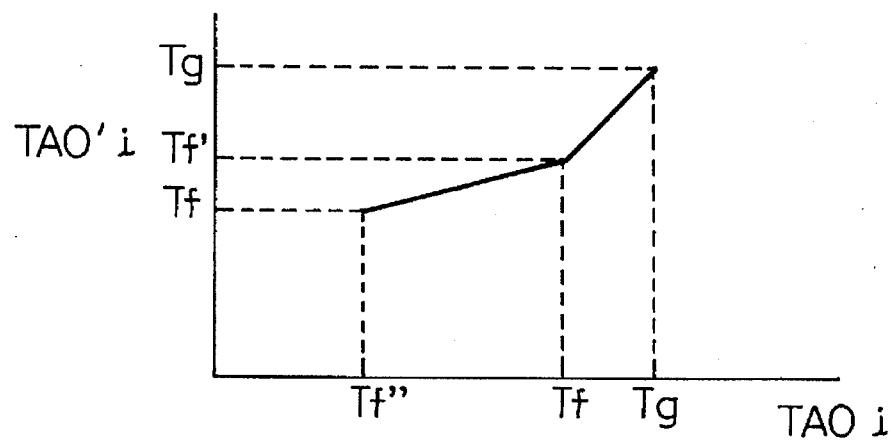
FIG. 10C is a graph showing the characteristic relation between the necessary blowing temperature and the target blowing temperature in the foot mode, among respective blowing modes in the second embodiment of the present invention.

In the respective blowing modes as described in the above first embodiment according to the present invention, if the necessary blowing temperatures to the driver's seat side and passenger's seat side are other than said respective predetermined temperatures, the former is set to be equal to said predetermined constant temperature. However, in this second embodiment, as shown in FIGS. 10A through 10C, it is not always required for the necessary blowing temperature to be constant, and it is allowed for the target blowing temperature TAO'i to have characteristics which exhibit a gradient with respect to the necessary blowing temperature TAOi. However, this second embodiment can provide the same effects as the first embodiment does, of course, and at the same time, since the target blowing temperature is made to vary in response to the change of environmental conditions like the vehicle temperature, the quantity of incident solar radiation, and so forth, the driver and passenger can be free from any feeling of discomfort that can be caused when the target blowing temperature fails to vary in response to the change of environmental conditions.

Here, it is noted that the respective steps as have been explained with reference to the flowcharts shown in FIGS. 3, 4, 7, and 8, constitute means for realizing respective functions as described in the above.

We claim:

1. An air conditioner having:

a blowing means for generating an air flow, first and second air passages for leading the air from said blowing means to first and second air conditioning zones in a compartment, respectively, and first and second temperature regulating means for regulating the air temperature in said first and second air passages, respectively, wherein the temperatures of the conditioned air respectively blown to said first and second air conditioning zones can be separately controlled by separately regulating said first and second temperature regulating means, said air conditioner comprising:

a first face air outlet and a first foot air outlet which are arranged at the downstream end of said first air passage, said first face air outlet being for blowing the conditioned air directing to the upper half of an air conditioner user's body in said first air conditioning zone and said first foot air outlet being for blowing the conditioned air directing to the foot area of the air conditioner user in said first air conditioning zone;

a second face air outlet and a second foot air outlet which are arranged at the downstream end of said second air passage, said second face air outlet being for blowing the conditioned air directing to the upper half of the air conditioner user's body in said second air conditioning zone and said second foot air outlet being for blowing the conditioned air directing to the foot area of the air conditioner user in said second air conditioning zone;

an air volume proportion regulating means for regulating a proportion between the air volume blown from said first and second face air outlets and the air volume blown from said first and second foot air outlets; and an air volume proportion setting means for setting said air volume proportion in said air volume proportion regulating means;

whereby a variable range of the blowing temperature to said first and second air conditioning zones is made changeable in response to the air volume proportion set by said air volume proportion setting means.

2. An air conditioner as claimed in claim 1, wherein there are provided:

first and second temperature setting means for setting the target temperatures in said first and second air conditioning zones;

a compartment temperature detecting means for detecting a temperature in a compartment, and first and second necessary blowing temperature calculating means for calculating first and second necessary blowing temperatures in said first and second air conditioning zones based on the temperatures set by said first and second temperature setting means and the temperature as detected by said compartment temperature detecting means; and wherein said air volume proportion setting means is constituted with a target air volume proportion deciding means for deciding a target air volume proportion in said air volume proportion regulating means based on said first and second necessary blowing temperatures, and an air volume proportion controlling means for controlling said air volume proportion regulating means for regulating the air volume in such a manner that said actual air volume proportion becomes said target air volume proportion.

3. An air conditioner having:

a blowing means for generating an air flow, first and second air passages for leading the air from said air blowing means to first and second air conditioning zones in a compartment, respectively, first and second temperature regulating means for regulating the air temperatures in said first and second air passages, respectively, first and second target blowing temperature calculating means for calculating first and second blowing temperatures to said first and second air conditioning zones, and first and second temperature control means for controlling said first and second temperature regulating means in such a manner that the blowing temperatures to said first and second air conditioning zones come to said first and second target blowing temperatures that are calculated by said first and second target blowing temperature calculating means, said air conditioner comprising:

a first face air outlet and a first foot air outlet which are arranged at the downstream end of said first air passage, said first face air outlet being for blowing the conditioned air directing to the upper half of an air conditioner user's body in said first air conditioning zone and said first foot air outlet being for blowing the conditioned air directing to the foot, area of the air conditioner user in said first air conditioning zone;

a second face air outlet and a second foot air outlet which are arranged at the downstream end of said second air passage, said second face air outlet being for blowing the conditioned air directly onto the upper half of an air conditioner user's body in said second air conditioning zone and said second foot air outlet being for blowing the conditioned air directly into the foot area of the air conditioner user in said second air conditioning zone;

an air volume proportion regulating means for regulating a proportion between the air volume blown from said first and second face air outlets and the air volume blown from said first and second foot air outlets;

an air volume proportion setting means for setting said air volume proportion in said air volume proportion regulating means;

first and second temperature setting means for setting the target temperatures to said first and second air conditioning zones; and a compartment temperature detecting means for detecting the temperature in a compartment, wherein said first and second target temperature calculating means are constituted with:

first and second necessary blowing temperature calculating means for calculating the first and second necessary blowing temperatures in said first and second air conditioning zones based on the first and second temperatures set by said first and second temperature setting means and the temperature detected by said room temperature detecting means; and first and second target blowing temperature deciding means which decide first and second target blowing temperatures by limiting said first and second necessary blowing temperatures to the temperatures within a range corresponding to said air volume proportion set by said air volume proportion setting means, and using said limited temperatures as the first and second target blowing temperatures.

4. An air conditioner claimed as claim 3, wherein said first and second target blowing temperature deciding means comprises:

a face mode condition judging means for judging whether or not the condition set by said air volume proportion setting means is the face mode condition that said first and second face air outlets are opened while said first and second foot air outlets are closed, and first and second face mode target blowing temperature deciding means, which decide the first and second target blowing temperatures by limiting said first and second necessary blowing temperatures to the temperatures lower than a first predetermined temperature, and using said limited temperatures as first and second target blowing temperatures, when said face mode condition is judged by said face mode condition judging means.

5. An air conditioner as claimed in claim 3, wherein said first and second target blowing temperature deciding means comprises:

a bi-level mode condition judging means for judging whether or not the condition set by said air volume proportion setting means is the bi-level mode condition that said first and second face air outlets and said first and second foot air outlets are all opened; and first and second bi-level mode target blowing temperature deciding means, which decide the first and second target blowing temperatures by limiting said first and second necessary blowing temperatures to the temperature that is higher than a second predetermined temperature but lower than a third predetermined temperature, and using said limited temperature as first and second target blowing temperatures, when said bi-level mode condition is judged by said bi-level mode condition judging means.

6. An air conditioner claimed as claim 3, wherein said first and second target blowing temperature deciding means comprises:

a foot mode condition judging means for judging whether or not the condition set by said air volume proportion setting means is the foot mode condition and that said first and second face air outlets are closed while said first and second foot air outlets are opened, and first and second foot mode target blowing temperature deciding means, which decide the first and second target blowing temperatures by limiting said first and second necessary blowing temperatures to a temperature that is higher than a fourth predetermined temperature, and using said limited temperature as first and second target blowing temperatures, when said foot mode condition is judged by said foot mode condition judging means.

7. An air conditioner as claimed in claim 3, wherein said air volume proportion setting means comprises:

a target air volume proportion deciding means which decides a target air volume proportion in said air volume proportion setting means based on said first and second necessary blowing temperature, and an air volume proportion control means which controls said air volume proportion regulating means in such a manner that the actual air volume proportion becomes said target air volume proportion.

8. An air conditioner as claimed in claim 4, wherein said air volume proportion setting means comprises:

a target air volume proportion deciding means which decides a target air volume proportion in said air volume proportion setting means based on said first and second necessary blowing temperatures, and an air volume proportion control means which controls said air volume proportion regulating means in such a manner that the actual air volume proportion becomes said target air volume proportion.

9. An air conditioner as claimed in claim 5, wherein said air volume proportion setting means comprises:

a target air volume proportion deciding means which decides a target air volume proportion in said air volume proportion setting means based on said first and second necessary blowing temperatures, and an air volume proportion control means which controls said air volume proportion regulating means in such a manner that the actual air volume proportion becomes said target air volume proportion.

10. An air conditioner as claimed in claim 6, wherein said air volume proportion setting means comprises:

a target air volume proportion deciding means which decides a target air volume proportion in said air volume proportion setting means based on said first and second necessary blowing temperatures, and an air volume proportion control means which controls said air volume proportion regulating means in such a manner that the actual air volume proportion becomes said target air volume proportion.

* * * * *